Dec. 23, 1924. 1,520,495
W. K. FLEMING ET AL
STORAGE CELL COVER
Filed March 19, 1923
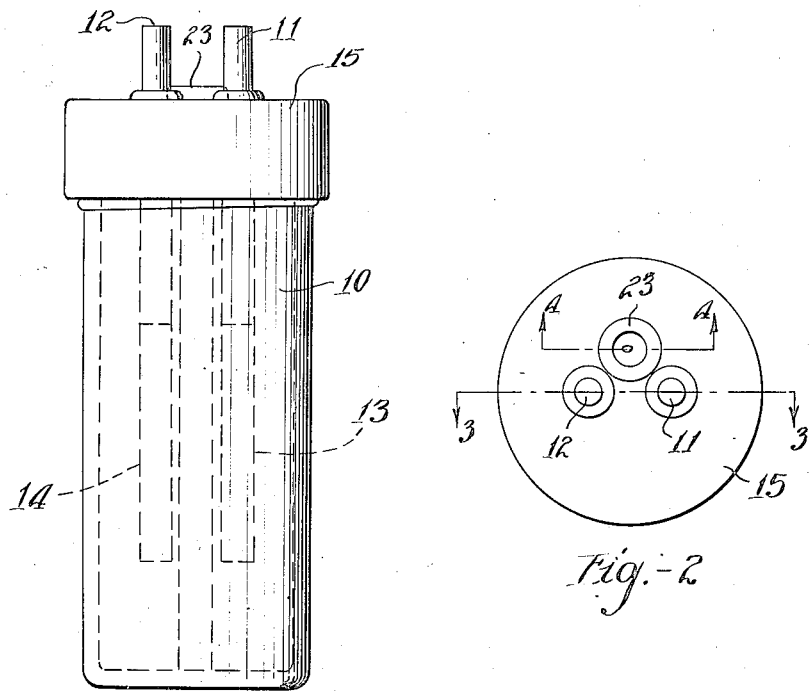
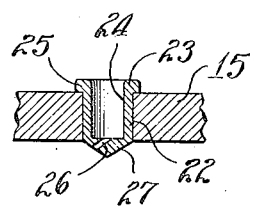
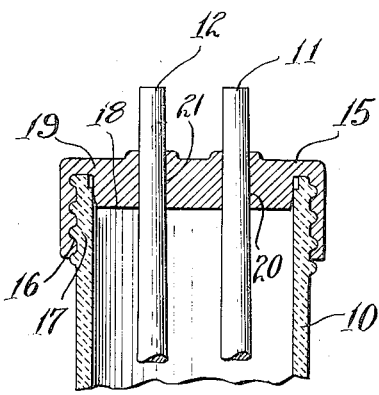
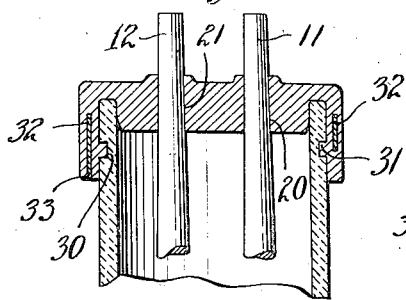
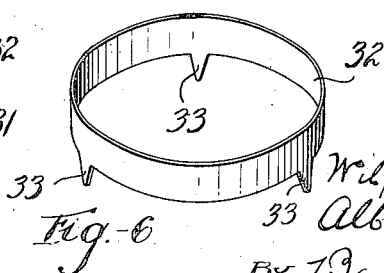
INVENTORS
Wilfred K. Fleming
Albert M. Backer
By Bates Macklin
ATTYS.

Patented Dec. 23, 1924.

1,520,495

UNITED STATES PATENT OFFICE.

WILFRED K. FLEMING AND ALBERT M. BAEHR, OF LAKEWOOD, OHIO, ASSIGNORS TO THE CLEVELAND ENGINEERING LABORATORIES COMPANY, OF CLEVELAND, OHIO, A CORPORATION OF OHIO.

STORAGE-CELL COVER.

Application filed March 19, 1923. Serial No. 626,194.

*To all whom it may concern:*

Be it known that we, WILFRED K. FLEMING and ALBERT M. BAEHR, citizens of the United States, residing at Lakewood, county of Cuyahoga, and State of Ohio, have invented a certain new and useful Improvement in a Storage-Cell Cover, of which the following is a full, clear, and exact description, reference being had to the accompanying drawings.

This invention relates to covers for storage cells, such as are adapted for use in "B batteries" for radio telephonic communication.

Some storage cells heretofore used, comprise a glass receptacle which is threaded at one end to receive a hard rubber cover through which the battery cell posts extend. To prevent leakage between the post and cover, the openings through which the posts extend have been made larger than the posts and soft rubber bushings or sleeves have been placed over the posts to provide a leak proof engagement with the walls of the openings in the cover. Similarly, to prevent leakage around the threads of the cover, it has been necessary to use a soft rubber gasket between the top of the jar and the inner wall of the cover.

A further requirement for such cell construction is the provision of a vent for permitting the escape of excess gas. Here too, the desirability for a cover which would prevent the escape of acid is important, and accordingly a separate gasket between the cell cover and vent plug has usually been required. We have found however, that the use of small gaskets and sleeves has increased not only the cost of material but also the time required for assembling such parts to make a complete cover.

One of the objects of our invention therefore, is the provision of a one-piece cover which prevents leakage from the cell without the necessity for gaskets sleeves and the like, and which is also adapted for retaining the posts in adjusted position.

Another object is to provide a vent plug which permits the escape of excess gas and prevents the expulsion of acid over the top of the cover.

The means for accomplishing the above objects will be hereinafter fully set forth in the following description which pertains to the accompanying drawings while the essential features will be summarized in the claims.

In the drawings, Fig. 1 is a side elevation of a storage cell having a cover constructed according to our invention; Fig. 2 is a plan view of the cell; while Figs. 3 and 4 are sections taken through the top portion of the cell and cover on the correspondingly numbered lines in Fig. 2 respectively; Fig. 5 is a section through a cell cover showing a modification of our invention and Fig. 6 is a perspective view of the reinforcement shown in the modified construction.

We have shown our invention in connection with a storage cell wherein 10 indicates a glass jar or receptacle, while 11 and 12 indicate the posts which are integral with the plates 13 and 14 respectively. The posts project through openings in the cover and protrude beyond the upper surface thereof to provide a sufficient area for attachment of a connector terminal.

The cover is shown as a cup-shaped member 15 having an interiorly threaded wall 16 which engages an exteriorly threaded portion 17 adjacent to the top of the jar. The inner surface of the cover is reinforced as at 18 to provide an annular recess 19 against which the top of the jar is adapted to engage. The reinforcement is preferably of such size as to closely engage the inner surface of the cell whereby the pliability of the rubber may serve as an additional protection to prevent leakage from the cell. Spaced openings 20 and 21 through the cover as shown in Fig. 3, are provided for receiving the posts 11 and 12 respectively. An additional spaced opening 22 is then provided for receiving the vent plug 23.

The cover is made of semi-rigid resilient rubber which is sufficiently pliable to prevent leakage and yet is sufficiently rigid to prevent removal of the cover without unscrewing it from the jar. We have found that a cover possessing this degree of rigidity is satisfactory for holding the posts in adjusted position without the use of soft rubber sleeves between the posts and cover. In addition, we may taper the posts slightly to provide a close-fitting engagement with the cover wherefore the pliability of the rubber effects a satisfactory connection.

The plug 23 shown particularly in Fig. 4 preferably comprises a hard rubber cup-shaped member having a recess 24 therein extending nearly the entire length of the plug. The outer end of the plug is provided with a flange 25 for closely engaging the top of the cover, while the bottom of the plug is pointed as at 26 to provide a satisfactory drip for the condensed acid vapors. The passage 27 leading from the recess 24 through the wall of the plug into the cell, is disposed at an oblique angle to the axis of the plug wherefore any minute drops of acid retained in the passageway are caused upon excessive pressure to be expelled against the side of the recess rather than over the top of the cover.

In Figs. 5 and 6, we have shown a reinforced cover construction which is well adapted for use in connection with jars having the construction shown in Fig. 5. The particular feature of this construction is the annular recess 30 in the jar and the cooperating shoulder 31 in the cover. The cover has a metallic reinforcement therein which strengthens the cover and prevents inadvertent removal from the cell. The preferred form of reinforcement is shown as a band of metal 32 having a plurality of spaced feet 33 depending therefrom. In addition to the reinforcing characteristic, the feet serve to position the reinforcement in the mold when the cover is made.

This construction enables the cover to be entirely constructed of one piece, thus materially reducing the cost of manufacture, and insures a simple, effective construction which has been found to be advantageous for retaining the plate posts in proper position and for preventing undue leakage between the cover and jar. Moreover, the vent plug construction provides an effective escape of excessive gas pressure within the cell while at the same time prevents the expulsion of acid over the top of the cover.

We claim:—

1. In combination, a jar, a cover therefor, said cover having an opening extending therethrough, a post projecting through the opening, said cover having a pliable portion immediately adjacent the opening to frictionally position the post and to prevent leakage between the post and the cover whereby said cover comprises the sole means for positioning the post within the jar.

2. A storage cell cover having a flat portion and an integral flanged portion, and having a metallic reinforcement embedded in the flanged portion.

3. In combination, a storage cell, a cover therefor, an endless recess on the inner side of the cover, the walls of said recess being in close-fitting engagement with the inner and outer walls and top of the jar respectively.

4. A storage cell having an endless recess in the outer side thereof, and a cover of pliable material having a shoulder cooperating with the recess.

5. In combination, a storage cell, a cover of pliable material therefor, an endless cooperating recess and shoulder for positioning the cover on the cell, and a reinforcement embedded in the cover for retaining the shoulder and recess in adjusted position.

6. A cover for a storage cell having a flat portion of electrical insulating material adapted to engage the top of a cell, and having a flanged portion for engaging the side of a cell, the flanged portion comprising resilient material whereby the cover may be positioned on or removed from a cell without requiring the cover to be rotated with reference to the cell.

7. A cover for a storage cell having a top portion of electrical insulating material adapted to engage the top of a cell, and having a flanged portion for engaging the side of the cell, there being a shoulder on the flanged portion for locking the cover to the cell, and said flanged portion comprising resilient material for enabling the cover to be moved longitudinally of the cell and positioned thereon without requiring the cover to be rotated with reference to the cell.

In testimony whereof, we hereunto affix our signatures.

WILFRED K. FLEMING.
ALBERT M. BAEHR.